United States Patent

(12) United States Patent
Sowa

(10) Patent No.: US 8,054,003 B2
(45) Date of Patent: Nov. 8, 2011

(54) SWITCH-OFF TIME REGULATION SYSTEM FOR AN INVERTER FOR DRIVING A LAMP

(75) Inventor: Wolfram Sowa, München (DE)

(73) Assignee: Osram AG, Munich (DE)

( * ) Notice: Subject to any disclaimer, the term of this patent is extended or adjusted under 35 U.S.C. 154(b) by 523 days.

(21) Appl. No.: 12/225,248

(22) PCT Filed: Mar. 5, 2007

(86) PCT No.: PCT/EP2007/052055
§ 371 (c)(1),
(2), (4) Date: Sep. 17, 2008

(87) PCT Pub. No.: WO2007/107447
PCT Pub. Date: Sep. 27, 2007

(65) Prior Publication Data
US 2009/0295299 A1 Dec. 3, 2009

(30) Foreign Application Priority Data
Mar. 17, 2006 (DE) .................... 20 2006 004 296 U

(51) Int. Cl.
*G05F 1/00* (2006.01)
(52) U.S. Cl. ........ 315/291; 315/219; 315/225; 315/224; 315/209 R
(58) Field of Classification Search ............... 315/209 R, 315/219, 224, 276, 291, 360; 361/21.12, 361/74, 78, 80, 97, 123
See application file for complete search history.

(56) References Cited

U.S. PATENT DOCUMENTS

| 5,097,182 | A | * | 3/1992 | Kelly ............................. 315/219 |
| 5,615,100 | A | * | 3/1997 | Radecker et al. ................ 363/97 |
| 5,982,108 | A | * | 11/1999 | Buij et al. .................. 315/209 R |
| 6,144,173 | A | * | 11/2000 | Nerone ........................... 315/291 |
| 7,045,973 | B2 | * | 5/2006 | Schallmoser .................. 315/291 |
| 7,564,673 | B2 | * | 7/2009 | Schallmoser et al. ......... 361/235 |
| 7,804,253 | B2 | * | 9/2010 | Fischer et al. ................. 315/224 |
| 2008/0151586 | A1 | | 6/2008 | Schallmoser et al. |

FOREIGN PATENT DOCUMENTS

| DE | 10 2004 008 908 A1 | 9/2005 |
| JP | 59060881 A | 4/1984 |
| JP | 63302769 A | 12/1988 |
| JP | 11307292 A | 11/1999 |
| JP | 2004179104 A | 6/2004 |
| WO | 96/38024 A | 11/1996 |
| WO | 03/043386 A1 | 5/2003 |

* cited by examiner

*Primary Examiner* — Haiss Philogene

(57) ABSTRACT

The present invention relates to an electronic ballast for operating a lamp (L) which has a Class E converter (T1, L1). When a lamp (L) is connected, the output current of the Class E converter (T1, L1) once a switching element (T1) of the Class E converter (T1, L1) has been switched off has a first and a second half-cycle of opposite polarity. The electronic ballast has a measurement apparatus for measuring the output current and a regulating apparatus for adjusting a switch-on time of the switching element. In this case, the measurement apparatus is designed to determine a first output current value of the first half-cycle and a second output current value of the second half-cycle, wherein the regulating apparatus for adjusting the switch-on time is fed a control variable based on the discrepancy between the two output current values.

15 Claims, 4 Drawing Sheets

SWITCH-OFF TIME REGULATION SYSTEM FOR AN INVERTER FOR DRIVING A LAMP

TECHNICAL FIELD

The present invention relates to an electronic ballast for operating a lamp which has a class E converter.

PRIOR ART

Electronic ballasts for operating lamps are known in a wide variety of designs. There are various embodiments for different lamp types with in each case different rated powers or operating modes. A lamp connected for operation may be, for example, a discharge lamp, in particular a dielectric barrier discharge lamp.

Electronic ballasts generate the lamp current necessary for operating the connected lamp. For this purpose, they have a converter. In principle, converters convert a power supply of the electronic ballast, for example the mains supply, into a power for operating the connected lamp. In this case, the output current and the output voltage of the converter are matched to the respective lamp type to be connected.

For example, class E converters for operating dielectric barrier discharge lamps, so-called DBD lamps, convert a DC voltage supply into a pulsed power supply. The DC voltage for operating the class E converter is in this case generally first generated by a rectifier from a mains supply.

A class E converter has a storage coil and a switching element. If the switching element is closed, a direct current which increases with time flows through the storage coil. If the switching element is open, a high induced voltage results across the storage coil owing to an abrupt change in current. The energy stored in the storage coil is coupled out and can therefore be supplied to the connected lamp. Then, or still during the voltage pulse across the storage coil, the switching element of the class E converter is closed again and the storage coil again begins to store energy.

A DBD lamp is a substantially capacitive load. The coupled-out output current of the class E converter charges the dielectrically impeded electrodes. Owing to the high voltage prevailing between the dielectrically impeded electrodes, a first discharge is initiated. Owing to an internal counterpolarization of the lamp, and because the lamp load circuit oscillates back correspondingly, renewed ignition, reignition, can take place. In this regard, reference is made to WO 00/13204 by the same applicant.

If a DBD lamp is operated via a class E converter, the output current of the class E converter can have two half-cycles with opposite polarity, possibly accompanied by ignition of the discharge medium and reignition.

However, the invention is not only concerned with electronic ballasts for DBD lamps, but also with ballasts for other lamp types which can be operated with temporally spaced-apart power pulses, to be precise particularly with ballasts for those lamps in which, or lamps which are connected in such a way that, there is a capacitive characteristic such as in the case of dielectric barrier discharge lamps.

DESCRIPTION OF THE INVENTION

The object of the invention is to specify an electronic ballast with a class E converter which is advantageous with respect to its output current.

The object is achieved by an electronic ballast for operating a lamp with a class E converter having a switching element for supplying power to the lamp to be connected, an output current of the class E converter, when the lamp is connected and once the switching element has switched off, having a first and a second half-cycle of opposite polarity, characterized in that the electronic ballast has a measurement apparatus for measuring the output current and a regulating apparatus for setting a switch-on time of the switching element, the measurement apparatus being designed to determine a first output current value of the first half-cycle and a second output current value of the second half-cycle, and the regulating apparatus for setting the switch-on time being supplied a controlled variable based on the discrepancy between the two output current values.

Preferred configurations of the invention are specified in the dependent claims and will be explained in more detail below.

If the switching element of the class E converter is switched off, an induced voltage occurs across the storage coil of the class E converter. As described above, a corresponding power can be coupled out, for example across a secondary coil. In this case, the output current of the class E converter can have a first and a second half-cycle with opposite polarity.

The invention is based on the fact which is known per se that the switch-on time of the switching element of the class E converter can have an effect on the power coupled into the lamp.

In the case of a DBD lamp, an optimized switch-on time can result, for example, in coupling-in of power which is improved by from 4 to 7%.

Class E converters can be operated both at resonance and without resonance. During resonant operation, the voltage across the switching element when the switching element is switched on is 0 V. The switch-on time during resonant operation is therefore temporally after the voltage pulse occurring across the storage coil.

During non-resonant operation, the switching element is switched on as early as during the voltage pulse.

The inventor has found that the switch-on time of the switching element during non-resonant operation has a considerable effect on the profile of the output current when the lamp is connected. If, for example, the first half-cycle of the output current has a positive polarity and, correspondingly, the second half-cycle of the output current has a negative polarity, and if the switching element of the class E converter is switched on at the falling edge of the output current, the peak values and the profile of the output current, primarily of the second half-cycle, are altered.

Predetermining a switch-on time in a time interval fixed at the switch-off time, for example by means of a microcontroller or a simple timing element, is problematic since the profile of the output current can be different for each connected lamp and may even vary during operation of the same lamp. Even lamps having an identical construction can represent differing capacitive loads owing to production tolerances. Even changes in the surrounding environment of a connected lamp can alter the effective capacitance of the load. The profile over time of the output current can even be changed by the lamp being touched or by a change in the position relative to the lampholder.

The invention is based on the concept of setting the switch-on time during the voltage pulse, on the basis of the profile over time of the output current. This is possible because the profile over time of the output current depends on the switch-on time.

For this purpose, an electronic ballast according to the invention has a measurement apparatus for measuring the output current. In this case, the measurement apparatus is designed to determine a first output current value of the first half-cycle and a second output current value of the second half-cycle. This may be, for example, averaging or an integral over an interval within each of the two half-cycles. The two half-cycles each have a peak value; this can, as explained further below, also be the output current value associated with the first and the second half-cycle. In principle, any desired functions of the output current are also conceivable, as long as they each produce an output current value which varies with the switch-on time in very monotonous fashion for at least one of the two half-cycles. It is possible, for example, that the first output current value is constant with respect to a variation of the switch-on time, but the output current value associated with the second half-cycle varies with this.

The measurement apparatus can also be designed to have two parts, the first part of the measurement apparatus determining the output current value for the first half-cycle and the second part of the measurement apparatus determining the output current value for the second half-cycle of the output current.

The electronic ballast furthermore has a regulating apparatus, which sets the switch-on time. In this case, the discrepancy between the two output current values is supplied to the regulating apparatus as a controlled variable. In the simplest case, the discrepancy between the two output current values can correspond to the difference between the absolute values of the peak values.

In a preferred case, this controlled variable can correspond, for example, to the difference between the absolute values of the peak values averaged over a plurality of switching cycles of the class E converter.

In a preferred embodiment of the invention, the measurement apparatus has two peak value detection circuits for this purpose. The circuits are designed to detect, as the first output current value, the peak value of the first half-cycle in the first of the two peak value detection circuits and to detect, as the second output current value, the peak value of the second half-cycle in the second of the two peak value detection circuits. Large signals can easily be achieved with peak value detection circuits.

Preferably, the setpoint variable used by the regulating apparatus corresponds to a difference between the absolute value of the first peak value and the absolute value of the second peak value of less than 40% of the greater of the two peak values. Differences in absolute values of less than 30%, 20%, 10%, 5% and 1% are further preferred, in the given sequence. A particularly large amount of power is coupled into the connected lamp for approximately the same ratios of absolute values of the first and the second peak values.

In a preferred embodiment of the invention, the measurement apparatus is designed to determine the output current of the class E converter using transformers. For this purpose, a coil can be introduced into the load circuit of the lamp and the measurement apparatus can have a secondary coil with respect thereto with a measuring resistor. Then, a voltage, which is proportional to the current in the load circuit, drops across the measuring resistor. However, a resistor can also connected in parallel with the storage coil of the class E converter, with the result that a voltage, which is proportional to the output current of the class E converter, drops across said storage coil. The resistor should have a sufficiently high resistance value to keep the losses as a consequence of the current flowing through this resistor low.

Preferably, the measurement apparatus is designed in such a way that discrepancies between the output current values are averaged over a plurality of switching cycles of the class E converter. A corresponding circuit arrangement can be realized with particularly little complexity.

In a preferred embodiment of the invention, the peak values are detected by the peak value detection circuits in the form of voltages, for example in peak value detection circuits which have a capacitor and a resistor. Preferably, the peak value detection circuits are then interconnected with a parallel circuit comprising an averaging capacitor and a resistor in such a way that the voltage across the averaging capacitor represents a time-interval-weighted mean value over the differences in absolute value of the two peak value of preceding switching cycles of the class E converter. As a result of the fact that a resistor is connected in parallel with the averaging capacitor, the averaging capacitor can be recharged with time via this resistor. In this case, the averaging is therefore not a simple arithmetic mean, but the differences in the absolute values of the peak values from the more recent past are given a greater weighting than those from the less recent past (reference is made to the exemplary embodiment for the way in which a corresponding circuit functions).

Preferably, the regulating apparatus also comprises a control apparatus for switching the switching element. This control apparatus comprises a first threshold value element, the controlled variable being supplied to a first input of the threshold value element, and the threshold value element being interconnected with the switching element in such a way that the first threshold value element can switch the switching element. The controlled variable supplied to the first input can be compared, for example, with a threshold implemented within the threshold value element. However, it is also possible for the threshold value to be supplied to the threshold value element via a further input thereof. More details will be given in the text which follows and in the exemplary embodiment of the circuitry of the first threshold value element.

The control apparatus itself, without the regulation, can therefore be designed in such a way that it predetermines a constant switch-off time. The controlled variable provided by the measurement apparatus can instruct the control apparatus to deviate from this constant switch-off time.

In a preferred embodiment of the invention, the regulating apparatus has a capacitor, a second threshold value element and a voltage source. In this case, a signal, which is proportional to the current through the switching element, is present at an input of the second threshold value element. This may be, for example, the voltage across a measuring resistor, which is connected in series with the switching element. The second threshold value element is interconnected with the capacitor in such a way that, when the threshold value is reached at the input of the second threshold value element, the charge of the capacitor is reversed in a first direction, for example discharged.

Preferably, the first threshold value element has a second input, and the capacitor is interconnected with one of the two inputs of the first threshold value element in such a way that a signal, which is proportional to the state of charge of the capacitor, is supplied to this input. If the capacitor is charged, for example, via the voltage coil, it can be interconnected, for example, with the second input of the first threshold value element in such a way that the potential at this second input increases with the increasing charging of the capacitor.

The control apparatus is in this case designed in such a way that the switching element is switched off owing to the first charge reversal of the capacitor via the first threshold value element. Furthermore, the control apparatus is designed in such a way that the charge of the capacitor is reversed in the other, second direction via the voltage source, for example the capacitor is charged. Finally, the first threshold value element switches the switching element on again owing to the second charge reversal of the capacitor, with the result, overall, that the charge-reversal time of the second charge reversal of the capacitor determines the switch-off time if the controlled variable supplied to the first threshold value element does not result in a discrepancy.

The controlled variable can now be supplied to one of the two inputs of the first threshold value element and thus modify the switch-off time. For example, the output signal of the measurement apparatus, i.e. the controlled variable, can be added to the reference voltage. A corresponding interconnection of the measurement apparatus with the control apparatus is shown in the exemplary embodiment.

In a preferred embodiment of the invention, the threshold value elements are comparators.

Preferably, the control apparatus is designed to discharge the capacitor via the output of the second threshold value element. This is particularly simple in terms of circuitry.

In addition, electronic ballasts for operating dielectric barrier discharge lamps are a preferred application area. Dielectric barrier discharge lamps are a type of lamp which can be operated easily via class E converters in a pulse method and represents capacitive load.

The invention is also concerned with an electronic ballast according to the invention together with a lamp which is suitable for operation using such a ballast, i.e. a lighting system.

The description above and below relating to individual features relates to the electronic ballast and the lighting system. Furthermore, it also relates to a method corresponding to the invention for operating a lamp with an electronic ballast having a class E converter. This applies even without specific mention explicitly being made of this.

The invention therefore in principle also relates to a method for operating a lamp with an electronic ballast, which has a class E converter having a switching element for supplying power to the lamp to be connected, with the following step: generation of an output current by the class E converter when a lamp is connected, this output current, after the switching off of the switching element, having a first and a second half-cycle of opposite polarity, characterized in that the method has the following steps: measurement of the output current with a measurement apparatus of the electronic ballast, setting of a switch-on time of the switching element with a regulating apparatus, determination of a first output current value of the first half-cycle and of a second output current value of the second half-cycle with the measurement apparatus and setting of the switch-on time with the regulating apparatus, the regulating apparatus being supplied a controlled variable which is based on the discrepancy between the two output current values.

BRIEF DESCRIPTION OF THE DRAWINGS

The invention will be explained in more detail below with reference to an exemplary embodiment. The individual features disclosed hereby can also be essential to the invention in other combinations.

FIG. 1b shows the output current of the class E converter from FIG. 1a.

PREFERRED EMBODIMENT OF THE INVENTION

Figure 1A:
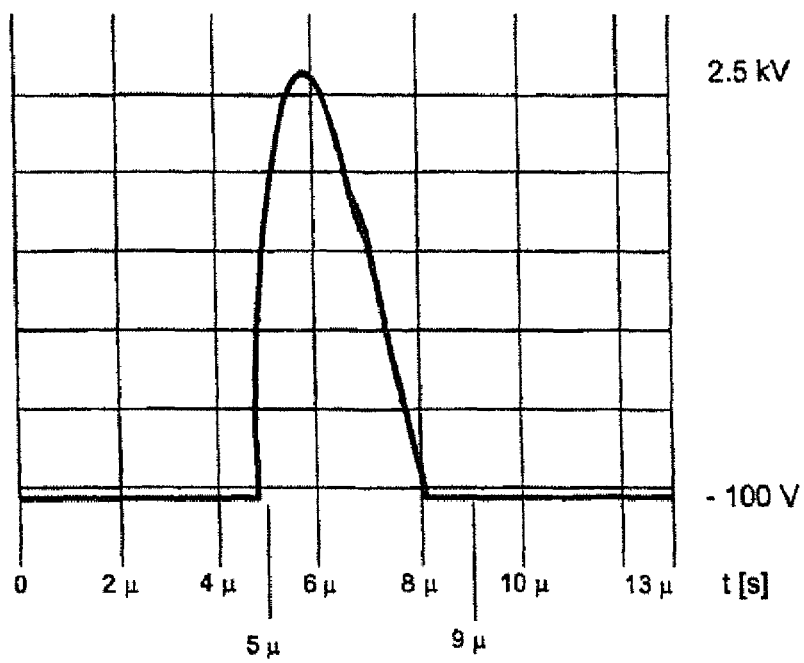
FIG. 1a shows the output voltage as a function of time in the case of a class E converter during resonant operation.
Figure 1B:
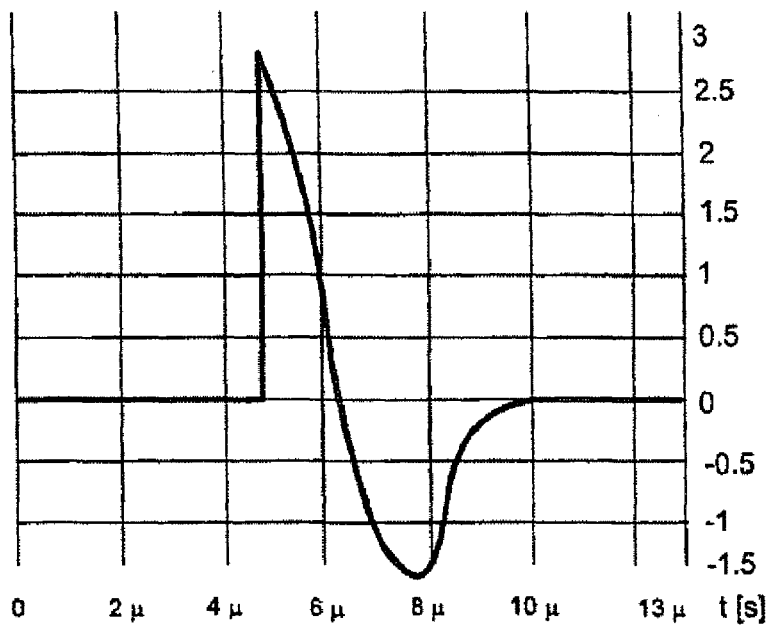

FIGS. 1a and 1b show the output voltage and the output current of a class E converter in accordance with the prior art.

Figure 4:
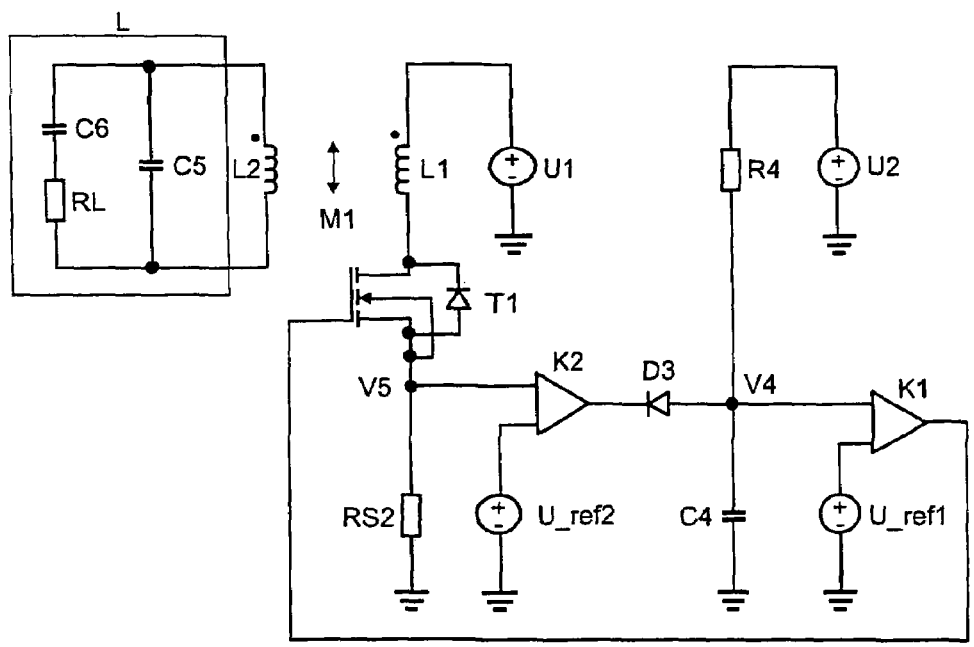
FIG. 4 shows a circuit diagram of a class E converter with a control apparatus according to the invention and a lamp which is coupled to the class E converter by means of transformers.

In order to explain FIGS. 1a and 1b, part of FIG. 4, which shows the circuit diagram of a class E converter, is included here.

The class E converter shown in FIG. 4 converts a constant DC voltage into a pulsed DC voltage. It has a DC voltage supply U1, a storage coil L1 and a switching element, in this case a MOSFET, T1. If the switching element T1 is switched on, the current through the storage coil L1 increases with time. If the switching element T1 is opened, the current through the storage coil L1 changes abruptly. The energy stored in the storage coil L1 can be coupled out via a secondary coil L2 and supplied to a connected lamp L. The switching element T1 can be operated at resonance and without resonance.

FIG. 1a shows how, at approximately 5 µs, the voltage across the secondary coil L2 increases rapidly from −100 V to 2.5 kV owing to the switching element T1 being switched off and then falls back to the initial value of −100 V within 3 µs. Such a voltage profile is typical for the DBD lamp connected here. The switching element T1 is only switched on again after this voltage pulse.

FIG. 1b shows the current through the secondary coil L2 for the case of FIG. 1a. This can be split into two half-cycles: during the first half-cycle, first ignition of the discharge medium in the lamp L takes place. Owing to the design of a counterpolarization in the discharge medium and a back-oscillation of the charging through the secondary circuit, i.e. the load circuit of the lamp, second ignition takes place during the second half-cycle. A detailed description of this is given in WO 00/13204.

Figure 2A:
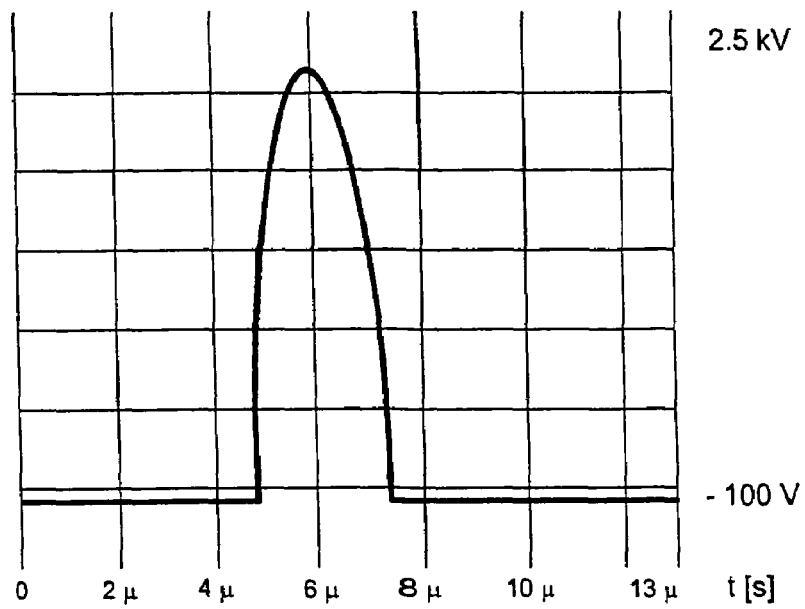
FIG. 2a shows the output voltage as a function of time in the case of a class E converter during non-resonant operation for an electronic ballast according to the invention.
Figure 2B:
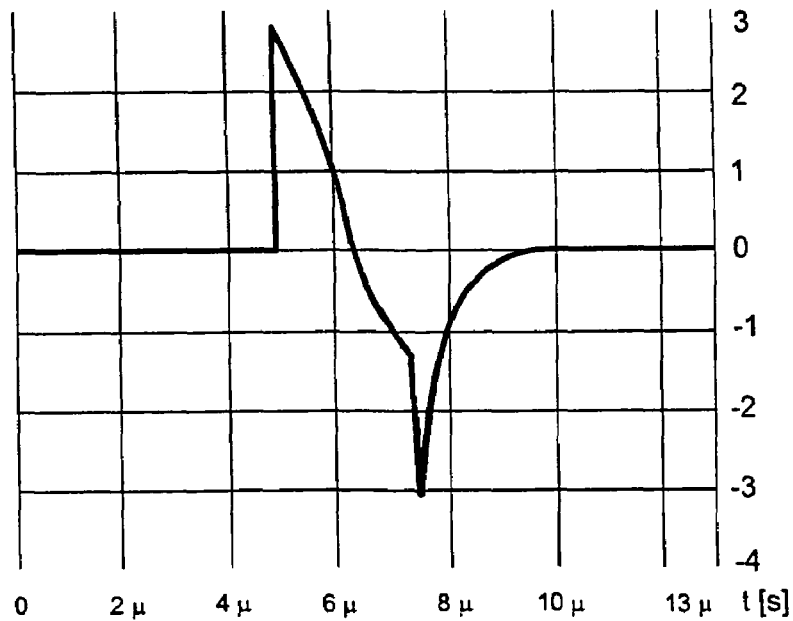
FIG. 2b shows the output current corresponding to FIG. 2a of the class E converter.

In contrast to FIGS. 1a and 1b, in FIGS. 2a and 2b the class E converter is not operated at resonance, i.e. the switching element is switched on again before the voltage pulse dropping across the secondary coil L2 has decayed. In FIG. 2a, it can be seen that the voltage pulse is chopped at its falling edge by means of the switching element T1 switching on and the voltage drop has a steeper gradient than in FIG. 1a. FIG. 2b shows the current through the secondary coil L2 relating to FIG. 2a. In comparison with FIG. 1a, the shape of the second half-cycle has changed. The current oscillation no longer has a soft, rounded profile but displays a pronounced peak. The peak results from the switching element T1 switching on during the steeply falling edge of the output voltage pulse. The switching-on of the switching element T1 assists the back-oscillation of the charging in the lamp load circuit. As a result, the peak value of the second half-cycle has approximately doubled.

In the electronic ballast according to the invention, the class E converter is not operated at resonance, i.e. as shown in FIGS. 2a and 2b. In the introduction to the description, it was stated that the power which can be coupled into the lamp changes during non-resonant operation with the switch-on time. Furthermore, the profile and in particular the peak values of the half-cycles change with a variation in the switch-on time of the switching element.

In this example, this peak value change is used for regulating the switch-off time, i.e. the time interval between the switching element T1 switching off and switching on again.

Figure 3:
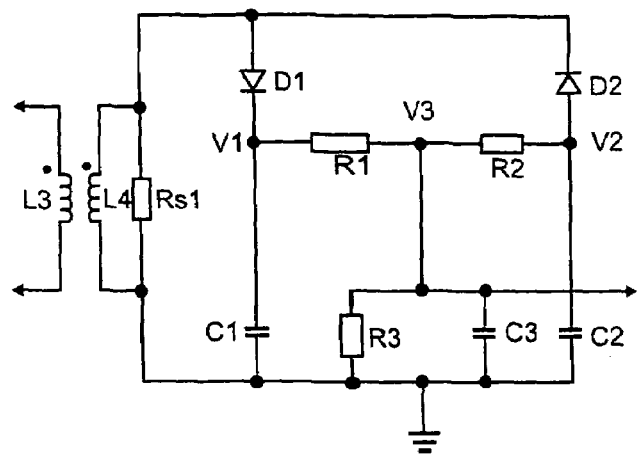
FIG. 3 shows a circuit diagram of a measurement apparatus according to the invention.

FIG. 3 shows the circuit diagram of a measurement apparatus according to the invention for measuring and processing the peak values of the output current of the class E converter. An inductance L3 is connected in series into the load circuit of the lamp. Secondary to the inductance L3, the measurement apparatus has an inductance L4. A measuring resistor RS1 is connected in parallel with this inductance L4. The voltage drop across the measuring resistor RS1 is proportional to the current flowing through the load circuit of the lamp, i.e. to the output current of the class E converter. A series circuit comprising a diode D1 and a capacitor C1 is connected in parallel with the measuring resistor RS1. The diode D1 blocks in one direction, with the result that the capacitor C1 stores the peak value across the measuring resistor RS1 for one of the two half-cycles of the output current of the class E converter.

A series circuit comprising a second capacitor C2 and a second diode D2 with reverse polarity is connected in parallel with the preceding series circuit. The peak value across the measuring resistor RS1 of the other half-cycle is stored in the second capacitor C2.

A series circuit comprising two resistors R1 and R2 is connected between a node V1 between the first diode D1 and the first capacitor C1 and a further node V2 between the second diode D2 and the second capacitor C2. A third capacitor C3 is connected between a node V3 between the resistors R1 and R2 and the reference potential. A current, which corresponds to the difference in the currents flowing away out of the capacitors C1 and C2, is generated via these resistors R1 and R2. The residual current is integrated in this third capacitor C3. A third resistor R3, via which the capacitor C3 can be discharged, is connected in parallel with the third capacitor C3.

The voltage present at the third capacitor C3 corresponds to a time integral over the difference of the peak values stored in the capacitors C1 and C2. Since the capacitor C3 discharges via the resistor R3, however, the differences in the integration are temporally weighted. The present difference between the two peak values has the greatest influence, whereas previous differences have less of an effect on the voltage across the capacitor C3 the greater the time interval becomes. The voltage drop across the capacitor C3 represents a controlled variable for the electronic ballast according to the invention.

FIG. 4 shows a circuit diagram of part of an electronic ballast according to the invention with the equivalent circuit diagram of a connected lamp.

The class E converter with the storage coil L1, the switching element T1 and a measuring resistor RS2 is supplied with power via a DC voltage supply U1. The storage coil L1, the switching element T1 and the measuring resistor RS2 are connected in this order between the positive supply potential U1 and the reference potential. Power is coupled into the lamp L via the coil L2, which is secondary to the storage coil L1.

The output of a first threshold value element, in this case a comparator K1, is interconnected with the control input of the switching element T1, with the result that the threshold value element K1 can switch the switching element T1 off and on. A reference voltage U_ref1 is present at an inverting input of the first threshold value element K1. The reference voltage U_ref1 acting as the threshold value is in this case formed from the output of the measurement apparatus and an offset (see FIG. 5). The voltage across a fourth capacitor C4 is present at a non-inverting input. This fourth capacitor C4 is interconnected with a voltage source U2 via a resistor R4, this series circuit comprising the resistor R4, and the fourth capacitor C4 being connected between the positive supply potential U2+ of the DC voltage source U2 and the reference potential. The non-inverting input of the first threshold value element K1 is interconnected with the capacitor C4 via a center tap V4 between the resistor R4 and the capacitor C4.

A second threshold value element K2, likewise a comparator, is interconnected, with an inverting input, with a node V5, between the switching element T1 and a measuring resistor RS2, which is connected in series with the switching element T1, with the result that the voltage drop across the measuring resistor RS2 is supplied to the inverting input of the second threshold value element K2. A reference voltage U_ref2 is present at a non-inverting input of the second threshold value element K2. The output of the second threshold value element K2 is connected to the node V4 via a diode D3, with the result that the fourth capacitor C4 can be discharged via the output of the second threshold value element K2.

A switching cycle of the class E converter proceeds in the circuit shown in FIG. 4 as follows:

If the switching element T1 is initially switched on, the current through the coil L1 and the measuring resistor RS2 increases. The storage coil L1 stores an increasing amount of energy and the voltage across the measuring resistor RS2 increases. If the voltage across the resistor RS2 and thus at the inverting input of the second threshold value element K2 increases to above the reference voltage U_ref2, firstly the fourth capacitor C4 is discharged via the output of the second threshold value element K2 to below the threshold value U_ref1 and secondly the second threshold value element K2 switches the switching element T1 off. The current flowing through the storage coil L1 changes abruptly and there is a high induced voltage across the secondary coil L2, which results in power being coupled into the lamp L, as shown in FIG. 2a.

While the switching element T1 is off, there is also no current flowing through the measuring resistor RS2 and the voltage at the inverting input of the second threshold value element K2 is again below the voltage U_ref2, with the result that the fourth capacitor C4 is not discharged again. The fourth capacitor C4 is now charged via the resistor R4 by the voltage source U2. The time constant of this charging operation is determined by the resistance value of the resistor R4 and the capacitance of the capacitor C4. If the voltage across the capacitor C4 and therefore at the non-inverting input of the first threshold value K1 increases to above the threshold value U_ref1, the first threshold value element K1 switches the switching element T1 on again and the next switching cycle begins.

Figure 5:
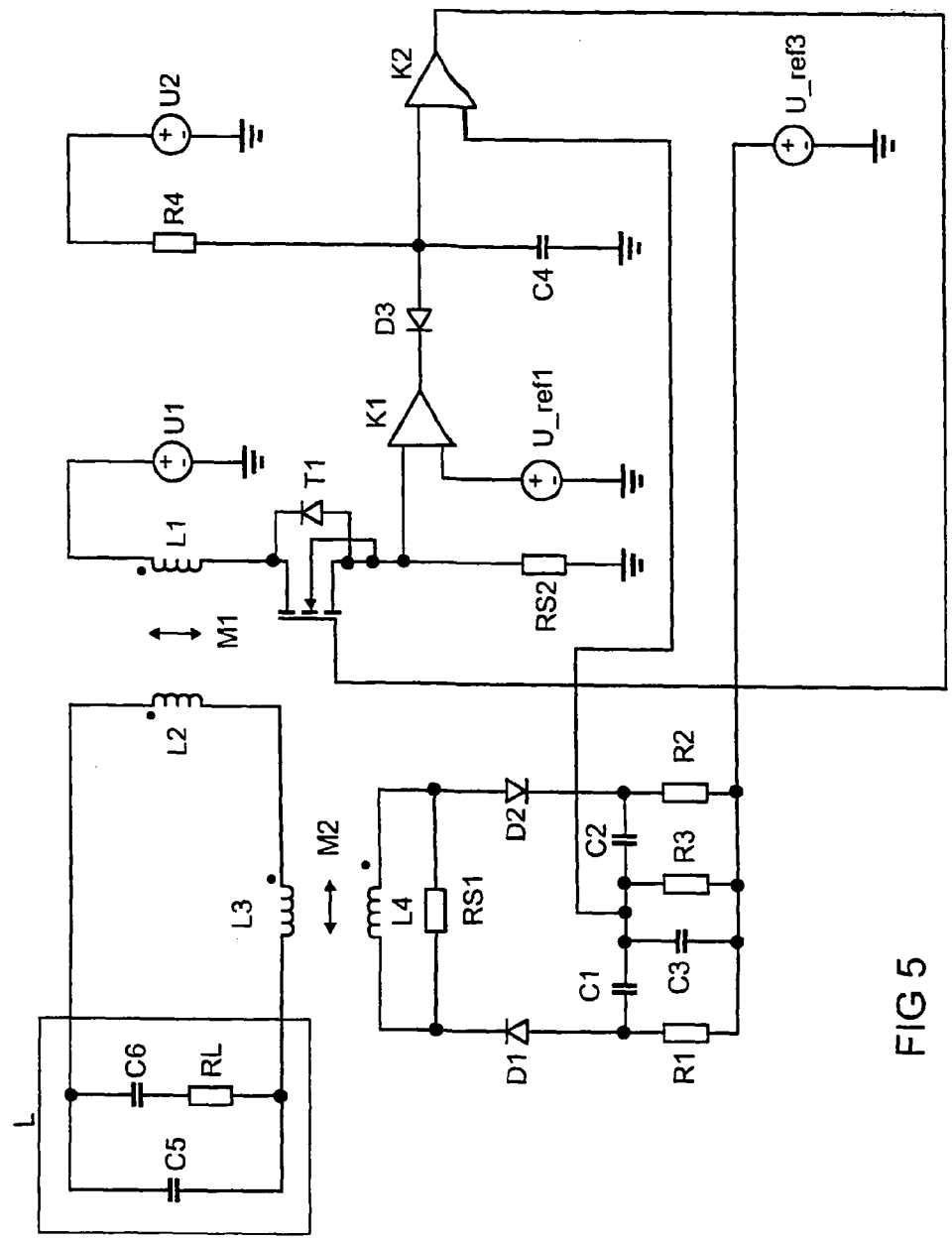
FIG. 5 shows a variation of the measurement apparatus from FIG. 3, the class E converter, the control apparatus from FIG. 4 and a connected lamp in a common circuit diagram illustrating an embodiment of the invention.

FIG. 5 shows a possibility as to how the measurement apparatus can be used to detect the peak values of the output current of the class E converter and how the controlled variable can be used specifically.

Furthermore, FIG. 5 shows a common circuit diagram of the measurement apparatus from FIG. 3, the lamp L, the class E converter and the circuit arrangement from FIG. 4. The third capacitor C3 is connected between the positive potential of a reference voltage source U_ref3 and the inverting input of the second threshold value element K2. The potential of the measurement circuit from FIG. 3 is thus shifted by the potential difference U_ref3. As before, the third capacitor C3 integrates the difference in the currents flowing out of peak value detection circuits D1, C1, R1. and D2, C2, R2, with the result that a voltage corresponding to the controlled variable drops across the capacitor C3.

If the peak values stored in the peak value detection circuits C1, R1 and C2, R2 deviate from one another, a voltage will form across the third capacitor C3 which should be added to the positive potential of the voltage source $U_{13}$ ref3 or deducted therefrom. This corresponds to a threshold value change in the second threshold value element K2, which has an effect on the duration of the switch-off time.

The invention claimed is:

1. An electronic ballast for operating a lamp (L) with a class E converter (T1, L1) having a switching element (T1) for supplying power to the lamp (L) to be connected, an output current of the class E converter (T1, L1), when the lamp (L) is connected and once the switching element (T1) has switched off, having a first and a second half-cycle of opposite polarity, characterized in that the electronic ballast has a measurement apparatus for measuring the output current and a regulating apparatus for setting a switch-on time of the switching element (T1), the measurement apparatus being designed to determine a first output current value of the first half-cycle and a second output current value of the second half-cycle, and the regulating apparatus for setting the switch-on time being supplied a controlled variable based on the discrepancy between the two output current values.

2. The electronic ballast as claimed in claim 1 in which the measurement apparatus has two peak value detection circuits (R1, C1, R2, C2) and is designed to detect, as the first output current value, the peak value of the first half-cycle in the first of the two peak value detection circuits (R1, C1) and to detect, as the second output current value, the peak value of the second half-cycle in the second of the two peak value detection circuits (R2, C2).

3. The electronic ballast as claimed in claim 2 in which the setpoint variable used by the regulating apparatus corresponds to a difference in the absolute values of the first and the second peak value of less than 40% of the greater of the two peak values.

4. The electronic ballast as claimed in claim 1, in which the measurement apparatus is designed to measure the output current using transformers.

5. The electronic ballast as claimed in claim 2, in which the measurement apparatus is designed to take the mean of the discrepancies between the output current values over a plurality of switching cycles of the class E converter (T1, L1).

6. The electronic ballast as claimed in claim 5, in which the peak values are detected by the peak value detection circuits (R1, C1, R2, C2) in the form of voltages, and the peak value detection circuits (R1, C1, R2, C2) are interconnected with a parallel circuit comprising an averaging capacitor (C3) and a resistor (R3) in such a way that the voltage across the averaging capacitor (C3) represents a time-interval-weighted mean value over differences in absolute value between the two peak values of previous switching cycles of the class E converter.

7. The electronic ballast as claimed in claim 1, in which the regulating apparatus comprises a control apparatus for switching the switching element (T1) with a first threshold value element (K1), the controlled variable being supplied to a first input of the threshold value element (K1), and the threshold value element being interconnected with the switching element (T1) in such a way that the first threshold value element (K1) can switch the switching element (T1).

8. The electronic ballast as claimed in claim 7, in which the control apparatus has:
a capacitor (C4),
a second threshold value element (K2) and
a voltage source (U2),
a signal, which represents the current through the switching element (T1), being present at an input of the second threshold value element (K2),
the second threshold value element (K2) being interconnected with the capacitor (C4) in such a way that, when the threshold value is reached at the input of the second threshold value element (K2), the charge of the capacitor (C4) is reversed in a first direction,
the first threshold value element (K1) has a second input, and the capacitor is interconnected with one of the two inputs in such a way that a signal, which is proportional to the state of charge of the capacitor (C4), is supplied to this input,
and the regulating apparatus being designed in such a way that
the switching element (T1) is switched off owing to the first charge reversal of the capacitor (C4) via the first threshold value element (K1),
the charge of the capacitor (C4) is reversed in the other, second direction via the voltage source (U2),
the first threshold value element (K2) switches the switching element (T1) on again owing to the second charge reversal of the capacitor (C4), with the result that the charge-reversal time of the second charge reversal of the capacitor (C4) determines the switch-off time.

9. The electronic ballast as claimed in claim 8, in which the two threshold value elements (K1, K2) of the regulating apparatus are comparators (K1, K2).

10. The electronic ballast as claimed in claim 9, in which the control apparatus is designed to discharge the capacitor (C4) via the output of the second threshold value element (K1).

11. The electronic ballast as claimed in claim 1 for operating a dielectric barrier discharge lamp (L).

12. A lighting system comprising an electronic ballast as claimed in claim 1, and a lamp (L) which can be used with this electronic ballast.

13. The electronic ballast as claimed in claim 2, in which the measurement apparatus is designed to measure the output current using transformers.

14. The electronic ballast as claimed in claim 1, in which the measurement apparatus is designed to take the mean of the discrepancies between the output current values over a plurality of switching cycles of the class E converter (T1, L1).

15. The electronic ballast as claimed in claim 2, in which the regulating apparatus comprises a control apparatus for switching the switching element (T1) with a first threshold value element (K1), the controlled variable being supplied to a first input of the threshold value element (K1), and the threshold value element being interconnected with the switching element (T1) in such a way that the first threshold value element (K1) can switch the switching element (T1).

* * * * *